United States Patent [19]

Craig

[11] Patent Number: 4,546,248

[45] Date of Patent: Oct. 8, 1985

[54] WIDE DYNAMIC RANGE VIDEO CAMERA

[75] Inventor: Glenn D. Craig, Huntsville, Ala.

[73] Assignee: The United States of America as represented by the Administrator of the National Aeronautics and Space Administration, Washington, D.C.

[21] Appl. No.: 530,185

[22] Filed: Sep. 8, 1983

[51] Int. Cl.⁴ .............................................. G02F 1/01
[52] U.S. Cl. .................................. 250/225; 350/354; 358/168
[58] Field of Search ............... 350/351, 354, 331, 345; 358/168, 169, 233, 234, 236, 219; 250/225, 229

[56] References Cited

U.S. PATENT DOCUMENTS 4,124,278  11/1978  Grinberg et al. .................... 350/342

Primary Examiner—David C. Nelms
Assistant Examiner—James Gatto
Attorney, Agent, or Firm—Joseph H. Beumer; John R. Manning; Leon D. Wofford, Jr.

[57] ABSTRACT

The invention is a television camera apparatus (10) wherein bright objects are attenuated to fit within the dynamic range of the system, while dim objects are not. The apparatus receives linearly polarized light from an object scene (12), the light being passed by a beam splitter (20) and focused on the output plane of a liquid crystal light valve (16). Light valve (16) is oriented such that, with no excitation from cathode ray tube (22), all light is rotated 90° and focused on the input plane of video sensor (28). The light is then converted to an electrical signal, which is amplified by amplifier (30) and used to excite CRT (22). The resulting image is collected and focused by lens (24) onto light valve (16), which rotates the polarization vector of the light to an extent preportional to the light intensity from CRT (22). The overall effect is to selectively attenuate the image pattern focused on sensor (28).

13 Claims, 4 Drawing Figures

WIDE DYNAMIC RANGE VIDEO CAMERA

ORIGIN OF THE INVENTION

The invention described herein was made by an employee of the United States Government and may be manufactured and used by or for the Government of the United States of America for Governmental purposes without the payment of any royalties thereon or therefor.

TECHNICAL FIELD

The present invention relates generally to television sensors and more particularly to television camera sensors capable of viewing scenes having a wide brightness range.

BACKGROUND OF THE INVENTION

Prior television sensors tend to only resolve either bright objects, by attenuation of the light, and thereby obscure dimly illuminated detail, or to allow bright scene areas to saturate the detector in order to observe dimly lit detail. The disadvantage of a system having a single sensor tube is that there is a finite dynamic range of brightness values which can be faithfully sensed by the device. Thus in high dynamic range scenes, details of a scene may be lost due to a conventional television camera's lack of intra-scene range. The National Aeronautics and Space Administration has a need for a camera system capable of handling such high dynamic range scenes, particularly for use on spacecraft in an orbital environment. There, it may be necessary to use television sensors which can handle scenes having very bright areas as well as very dimly lighted background areas which must not be attenuated.

One prior art sensing device having to do with the intensities of illuminated scenes is U.S. Pat. No. 4.124,278 to Grinberg et al. This patent discloses the concept of employing birefringent devices, such as liquid crystal light valves, for generating the subtraction of images; however, this reference does not accomplish the object of the present invention, namely, to selectively attenuate bright areas of a viewed scene so as to make the scene fit within the dynamic range of a sensing system.

U.S. Pat. No. 4,032,954 to Grinberg et al discloses the broad concept of a photo-activated alternating current liquid crystal light valve which can impose an AC voltage on a liquid crystal layer in direct relationship, both spatially and temporally, to the variations of intensity of an incident input image; however, this reference does not contemplate or disclose anything relating to the concept of combining the liquid crystal light valve with a wide dynamic range video camera and selectively attenuating independent areas of a scene in order to fit bright objects within the dynamic range of the system.

A third prior art patent. U.S. Pat. No. 4,227,201 to Grinberg et al discloses interface means for coupling CCD signals to a liquid crystal; however, this reference does not disclose or contemplate the use in combination of a wide dynamic range video camera employing a liquid crystal light valve to selectively attenuate areas of a viewed scene.

Thus the object of this invention is to go beyond the teachings of the prior art, particularly the Grinberg et al patents mentioned above, and produce a television camera sensing device which will selectively attenuate bright objects to fit within the sensor's dynamic range while dim images within the viewing scene are not attenuated.

SUMMARY OF THE INVENTION

The present invention is an apparatus employing a liquid crystal cell as an optical/electronic automatic gain control feedback mechanism for selectively attenuating areas of a scene viewed by a television camera so that bright objects are attenuated to fit within the dynamic range of the system, while dim objects are not attenuated. More specifically the apparatus receives light from an object scene, passes the light through a polarizer and a similarly polarized beamsplitter and focuses the light on the output plane of the liquid crystal light valve. The beamsplitter passes all the light received from the polarizer and splits or reflects in another direction light received back from the light valve. In the absence of an input from the CRT, the light reflected back to the beamsplitter from the light valve has its polarization vector rotated 90° by the light valve, and all of the light passes to the video sensor. However, when an input light image from the CRT is impressed upon the input window of the liquid crystal light valve, the amount of rotation of the polarization vector is decreased to an extent depending on light intensity from the CRT. The overall result is to selectively attenuate the image pattern focused on the face plate of the video sensor, bright objects being attenuated more than dimmer ones. This provides an optical/electronic automatic gain control feedback arrangement for maintaining the optical signal level arriving at the input of the video sensor at a level within the desired dynamic range. Alternatively, the invention may comprise the use of a matrix-addressed transmission mode liquid crystal light valve in a wide dynamic range video camera in order to selectively attenuate bright objects of a scene.

BRIEF DESCRIPTION OF THE DRAWINGS

A presently preferred embodiment of the invention as well as an alternative embodiment will now be described in detail in connection with the accompanying drawings, wherein.

DETAILED DESCRIPTION OF THE INVENTION

Figure 1:
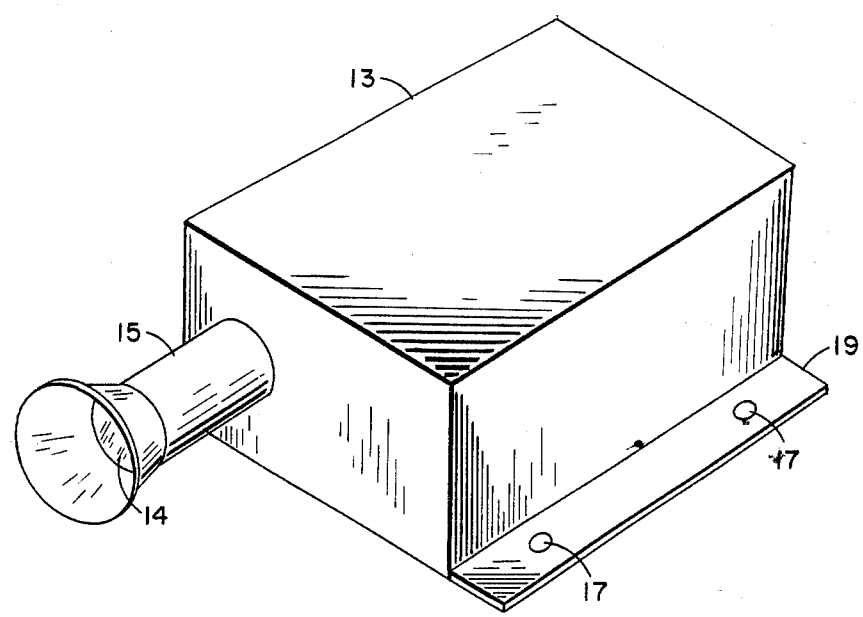
FIG. 1 is a perspective view of the preferred embodiment of the invention.

The perspective view of the preferred embodiment of the invention shown in FIG. 1 illustrates a simple box-like camera case 13 having lens 14 in lens holder 15. The case 13 may be attached to a tripod or other object by use of flange 19 having screw holes (or bolt holes) 17. Lens holder 15 is positioned off-center on the front surface of the camera case in order to provide room for the video sensor 28, as will be understood from a study of FIG. 2.

Figure 2:
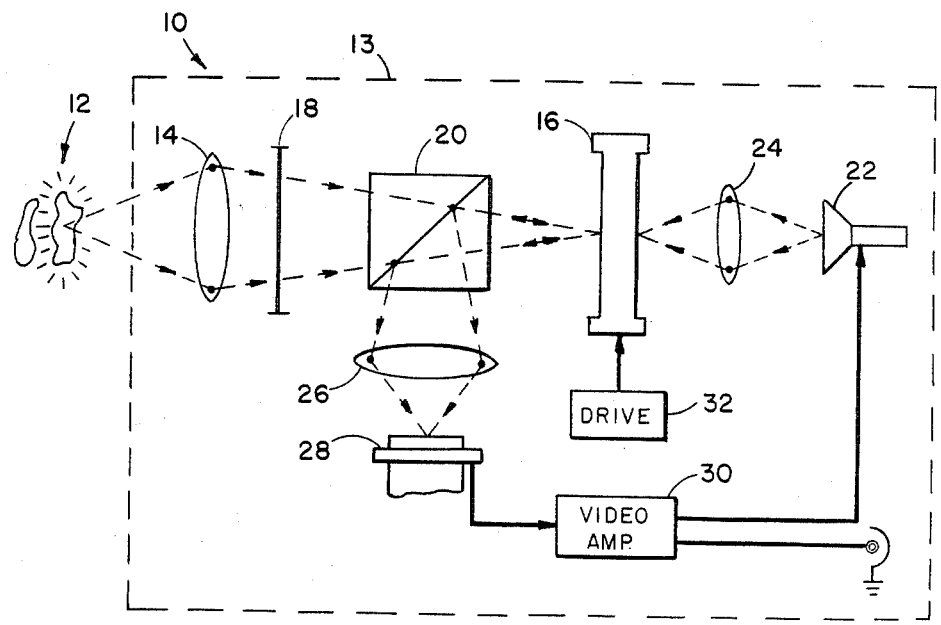
FIG. 2 is a diagrammatic illustration of an optical system illustrating the preferred embodiment of the invention.

The wide dynamic range camera system designated generally by numeral 10 operates as illustrated diagrammatically in FIG. 2. Dotted line 13 represents the case and chassis to which all elements of the camera system 10 are firmly attached. Light from an object scene 12 is collected and focused by lens 14. The light is brought to focus at the output plane of the liquid crystal light valve 16, which is connected to drive electronics 32. The light passes through the polarizer 18 and the polarization selective beamsplitter 20 and in so doing arrives at the light valve 16 in a linearly polarized state. The light valve 16 is oriented such that with no excitation from the cathode ray tube 22 through lens 24, all light is rotated 90° in polarization and reflected perpendicular to its original path due to the polarization selective characteristics of beamsplitter 20.

It should now be evident that the change in rotation of the polarization vector of the output light effected by the light valve 16 results in a reduction of the polarized light reflected from the beamsplitter 20. The reflected light traverses a path through lens 26 to be focused at the input plane of video sensor 28.

In the video sensor 28, the light is converted to an electrical video signal and is amplified by the amplifier 30. The electrical signal from amplifier 30 is now utilized to excite the cathode ray tube (CRT) 22 and produce an image on its face which is a duplicate of the image formed at the input face of the sensor 28. The image formed on cathode ray tube 22 is collected and brought to focus by lens 24 upon the input window of liquid crystal light valve 16. This light image input has the effect of causing the light valve 16 to rotate the polarization vector of the light, transversing its output section, to undergo a rotation less than the original 90° rotation. Since this effect is proportional to light intensity coming from CRT 22, the overall effect is to selectively attenuate the image pattern focused on the faceplate of sensor 28.

Thus bright objects will produce a feedback signal through the sensor system and thereby be attenuated. This process becomes in effect an optical/electronic automatic gain control feedback mechanism which attempts to maintain the optical signal level arriving at the input of the sensor 28 at a constant level within its own dynamic range. The sensor 28 dynamic range operating alone is approximately 200:1. The attenuation range of the liquid crystal light valve 16 is approximately 100:1. Therefore, since the system multiplies the range of the sensor and the range of the light valve, the system exhibits a capability for viewing scenes with brightness ranges of 20,000:1 within the same scene.

Figure 3:
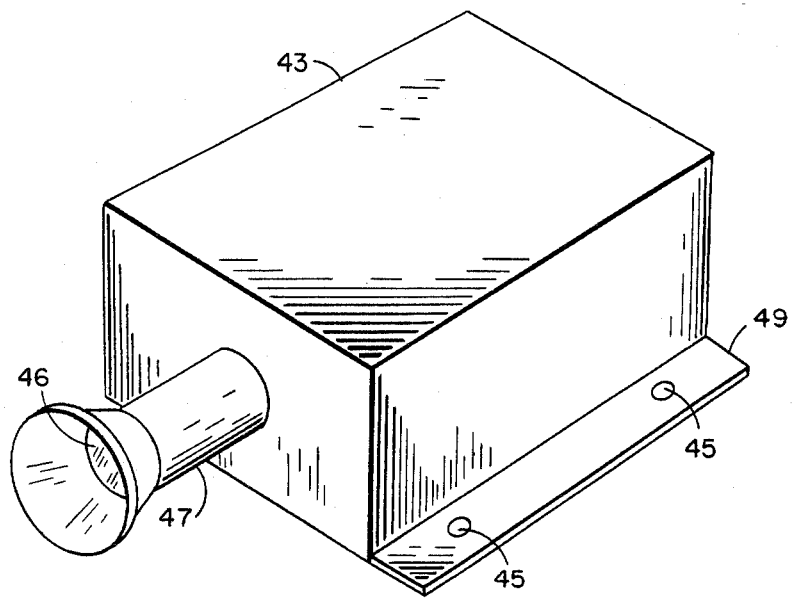
FIG. 3 is a perspective view of an alternative embodiment of the invention.

The perspective view of the alternative embodiment of the invention shown in FIG. 3 illustrates a simple box-like camera case 43 having lens 46 in lens holder 47. The case 43 may be attached to a tripod or other object by use of flange 49 having screw holes (or bolt holes) 45. Unlike the preferred embodiment shown in FIG. 1, the alternative embodiment of the invention shown in FIG. 3 has its lens holder 47 mounted in the center of the front surface of the camera case 43. This is possible because video sensor 50 is mounted on the main optical axis of this embodiment, as will be understood from a study of FIG. 4.

Figure 4:
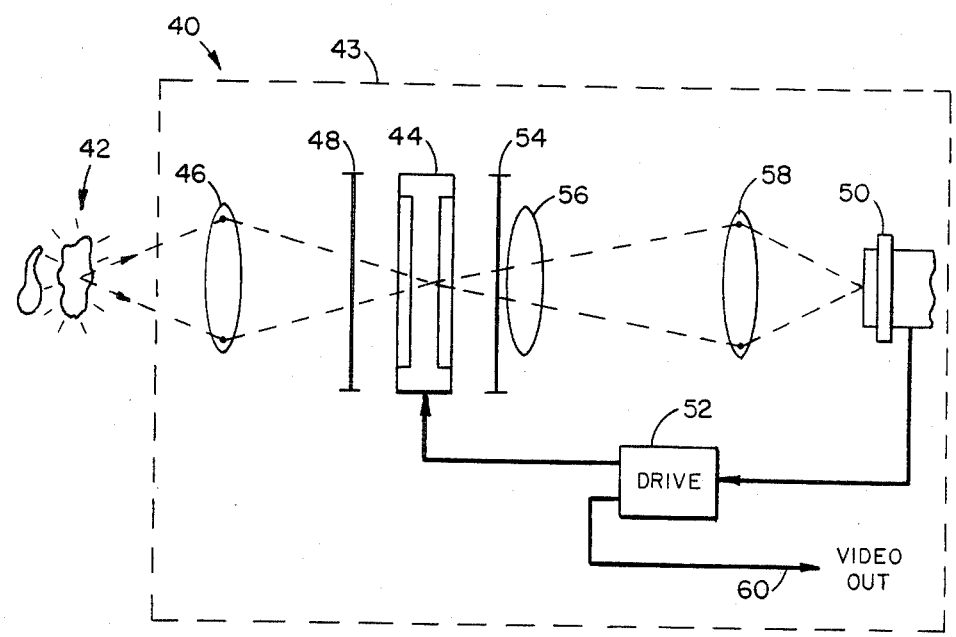
FIG. 4 is a diagrammatic illustration of an optical system illustrating the alternative embodiment of the invention wherein a reflective mode light valve is replaced by a transmission mode light valve device.

Shown in FIG. 4 is a diagram illustrating an alternative embodiment of the invention designated generally by numeral 40, in which a reflective-mode, liquid crystal light valve is replaced by a transmission-mode, liquid crystal light valve device. In the transmission-mode device, the liquid crystal phenomena previously described is implemented with a transparent electrode structure providing the electric fields required. This electrode structure is then selected and addressed by a suitable electronic system, CCD registers, etc., and impresses a two-dimensional image pattern on the light valve device 44 which is then able to selectively attenuate areas of the image field of the complete optical system.

In this alternative system shown in FIG. 4, dotted line 43 represents the case and chassis to which all elements of the camera system 40 are firmly attached. Light from an object 42 is brought to optical focus at an image plane on light valve 44 by a lens system 46. This light passes through a polarizer 48. The light valve 44 selectively rotates the plane of polarization of selected areas of the image field in response to the video signal from the video sensor 50 and the drive amplifier 52. The light then passes through polarizer 54 and is passed or attenuated by the polarizer 54 in relation to its degree of rotation from its original polarization state. Lens 56 serves as a relay field lens for optical efficiency. The light is then focused by lens 58 onto sensor 50, which may be a television vidicon detector. The signal from sensor 50 is used to feedback a signal to the light valve 44 and to provide an output video signal 60 for external use.

Liquid crystal light valves are now well-known to those skilled and well-versed in optics, so the details of the light valves used in the two embodiments of the present invention are not described herein. These light valves used in the present invention and discussed above, both the reflective-mode and transmission-mode types, are for sale commercially by the Hughes Aircraft Company of Culver City, Calif. The Hughes Aircraft Company has already obtained a number of patents relating to liquid crystal light valves, including the three patents to Grinberg et al discussed above as prior art. Hughes Aircraft Company patents on basic liquid crystal light valves include the following:

1. U.S. Pat. No. 3,824,002 to Terry D. Beard, "Alternating Current Liquid Crystal Light Valve," dated July 16, 1974.

2. U.S. Pat. No. 3,976,361 to Lewis M. Fraas et al, "Charge Storage Diode with Graded Defect Density Photocapacitive Layer," dated Aug. 24, 1976.

3. U.S. Pat. No. 4,019,807 to Donald D. Boswell et al, "Reflective Liquid Crystal Light Valve with Hybrid Field Effect Mode," dated Apr. 26, 1977.

A technical journal article which originated at the Hughes Research Laboratories in Malibu, Calif. is: "A New Real-Time Non-Coherent to Coherent Light Image Converter," Jan Grinberg et al, *Optical Engineering*, Volume 14, May–June, pp. 217–225 (1975). The disclosure from this article and the three patents listed immediately above are incorporated herein by reference.

From the foregoing it will be apparent that the inventor has made a television camera system which has the capability of handling a wider range of light intensities within its image field than has been possible in the past. The device can handle very bright images having a very dim background within the same scene. This is accomplished in the preferred embodiment by the combination of a liquid crystal light valve with a wide dynamic range video camera and selectively attenuating independent areas of the scene in order to fit bright objects within the dynamic range of the system. Thus this camera system produces a theoretical advantage over conventional wide range video cameras of about 100:1.

While specific embodiments of the invention have been illustrated and described herein, it is realized that modifications and changes will occur to those skilled in the art. It is therefore to be understood that the appended claims are intended to cover all such modifications and changes as fall within the true spirit and scope of the invention.

I claim:

1. A wide dynamic range video system for significantly attenuating bright areas in the image of a scene comprising:
   a liquid crystal light valve means adapted to receive a linearly polarized input light pattern and therefrom produce a linearly polarized output light pattern and having control means adapted to variably and selectively rotate the polarization vectors of light in said output light pattern;
   a first lens means for collecting light from a viewing scene and focusing the same on said light valve means as an input light;
   a first polarizer means adapted to linearly polarize said input light;
   a viewing means for viewing the output light from said light valve means;
   a second polarizer means to modify said output light in response to the degree of rotation of polarization vectors;
   said viewing means being adapted to provide a control signal to said light valve means for causing selective rotation of the polarization vectors of said output light pattern whereby said second polarizer means will selectively attenuate the light received by the viewing means.

2. A system as set forth in claim 1 wherein:
   said light valve means is of the reflective mode type in which the input light pattern falls upon one plane and the output light pattern is reflected back through said one plane with second polarization vectors proportional to the intensity of a second received light image from another source on a second plane;
   said second polarizer means includes a beamsplitter feature for redirecting the output light from said light valve means; and
   said viewing means includes a video sensor for receiving the redirected light from said beamsplitter feature and for producing a video signal, a cathode ray tube which receives the video signal from said video sensor and produces an image pattern on its face corresponding to the image pattern received by said light valve means upon its one plane from said input light, and a second lens means for focusing the light image pattern on said cathode ray tube onto said second plane of said light valve means.

3. A system as set forth in claim 2 including means for amplifying said video signal from said video sensor and transmitting said signal to said cathode ray tube.

4. A system as set forth in claim 3 including a third lens means for focusing said redirected light on said video sensor.

5. A wide dynamic range video camera comprising:
   a first plurality of optical elements positioned in linear fixed relationship to each other on a first optical axis, said elements comprising:
      first lens means for collecting light from a viewing scene and focusing said light;
      a liquid crystal light valve in optical communication with said first lens means;
      a polarizer located between said first lens and said liquid crystal light valve;
      a beamsplitter positioned between said polarizer and said liquid crystal light valve;
      a cathode ray tube in optical communication with said liquid crystal light valve and positioned on the side of said liquid crystal light valve opposite from said first lens means; and
      second lens means positioned between said cathode ray tube and said liquid crystal light valve;
   a second plurality of optical elements positioned in said camera in linear fixed relationship to each other on a second optical axis running through the center of said beamsplitter, said second optical axis being normal to said first optical axis, said elements comprising:
      a video sensor in optical communication with said beamsplitter and positioned opposite said beamsplitter; and
      third lens means positioned between said beamsplitter and said video sensor on said second optical axis, for focusing light rays from said beamsplitter on the input plane of said video sensor; and
   amplifier means connected to said video sensor and to said cathode ray tube for receiving an electrical video signal from said video sensor, amplifying said signal and transmitting said amplified signal to said cathode ray tube for producing an image on its face which is a duplicate of the image formed on the input face of said video sensor;
   whereby said liquid crystal light valve rotates light 90° in polarization and said beamsplitter reflects it normal to its original path except that when said light valve receives images from the face of said cathode ray tube, said light valve decreases the amount of rotation of the polarization vector of the light to an amount less than the original 90° rotation, said decrease being proportional to the intensity of the light from the cathode ray tube, and thus selectively attenuates the images of bright objects from said viewing scene.

6. A system as set forth in claim 1 wherein said light valve means is the transmission-mode type.

7. The system as set forth in claim 6 wherein said viewing means is a television vidicon detector.

8. A system as set forth in claim 7 including amplifier means connected to said vidicon detector and to said liquid crystal light valve for receiving an electrical video signal from said vidicon detector, amplifying said signal and impressing an image pattern on said light valve.

9. A wide range video camera comprising:
   a plurality of optical elements positioned in linear fixed relationship to each other on one optical axis, said elements comprising:
      first lens means for collecting light from an object scene and focussing said light;
      a liquid crystal light valve in optical communication with said first lens means;
      a first polarizer located between said first lens and said light valve;
      a video sensor in optical communication with said light valve;
      a second lens means positioned between said video sensor and said light valve; and
      a second polarizer located between said light valve and said second lens means; and
   amplifier means connected to said video sensor and to said light valve for receiving an electrical signal from said video sensor, amplifying said signal and impressing a two-dimensional image pattern on said light valve;

whereby said light valve selectively rotates the plane of polarization of selected areas of the image field in response to the video signal from said video sensor and said amplifier means and said second polarizer passes or attenuates light in relation to its degree of rotation from its original polarization state, thus providing an optical/electronic automatic gain feedback arrangement for maintaining the optical signal level arriving at the output of the video sensor at a constant level within the desired dynamic range of said video camera.

10. The wide dynamic range video camera of claim 9 including a third lens means on said one optical axis between said second polarizer and said second lens means, said third lens means being positioned to function as a relay field lens for providing more optical efficiency.

11. A method of selectively attenuating bright areas from a scene viewed by a video camera in order to bring them within the dynamic range of the camera system comprising:

linearly polarizing input light from said scene;

passing the resulting polarized light onto a liquid crystal light valve adapted to rotate the polarization vectors of said light and to vary the extent of such rotation in response to a control signal;

passing output light from said light valve through a polarizer means adapted to selectively attenuate the light in relation to variations in the degree of rotation of its polarization vectors;

passing the attenuated polarized light onto a video sensor adapted to produce a control signal indicative of brightness of discrete areas, and applying said control signal to said light valve.

12. The method of claim 11 wherein said output light from said light valve is reflected back therefrom, passed onto a polarizing beamsplitter, unattenuated portions of the resulting polarized light are deflected on an optical axis perpendicular to the input optical axis and said control signal from said video sensor is applied to said light valve through a cathode ray tube coupled with said sensor and said light valve.

13. The method of claim 11 wherein said input light is passed through said liquid crystal light valve and said video sensor is disposed on the same optical axis as the axis of the input light.

* * * * *